UNITED STATES PATENT OFFICE.

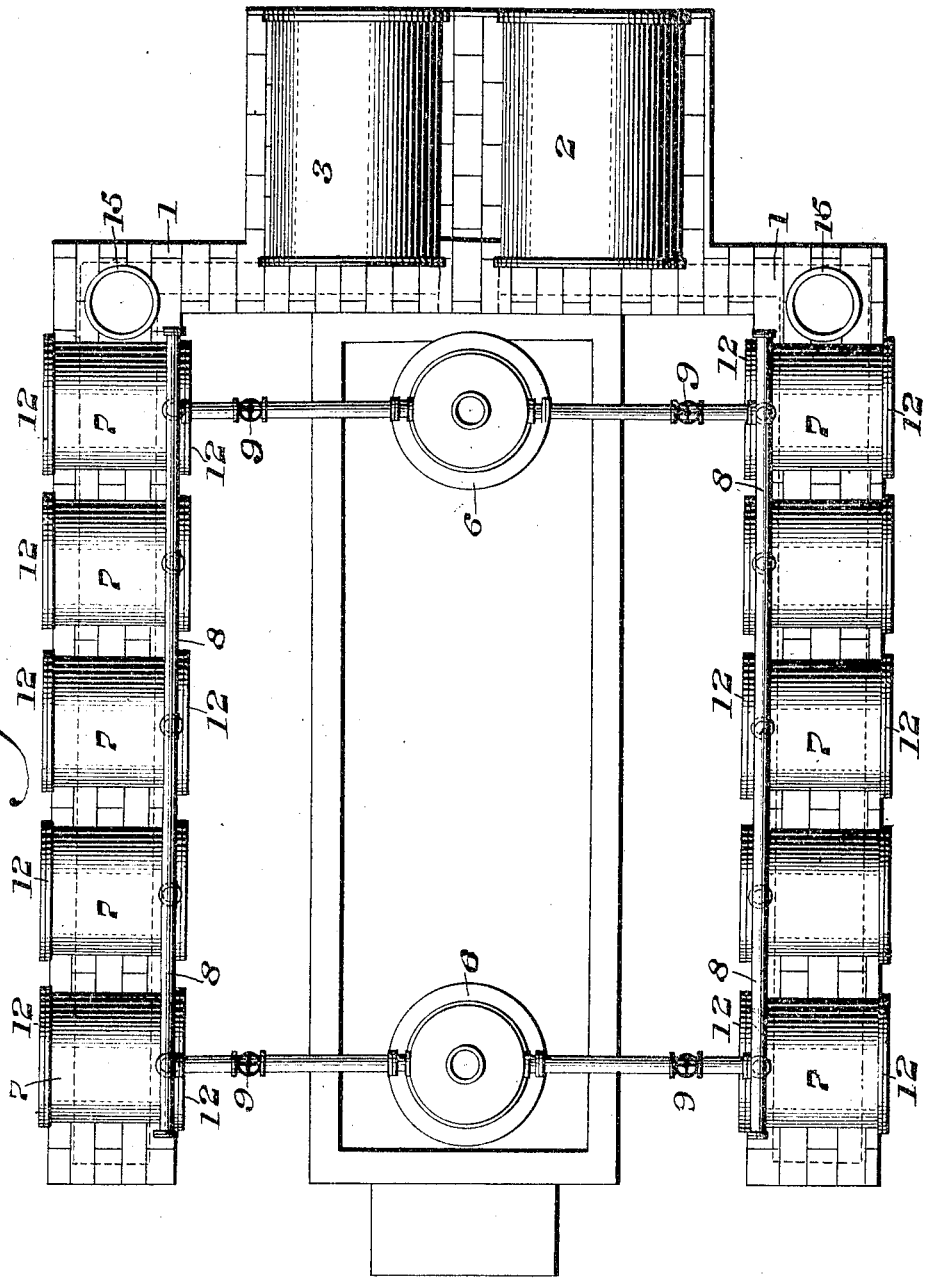

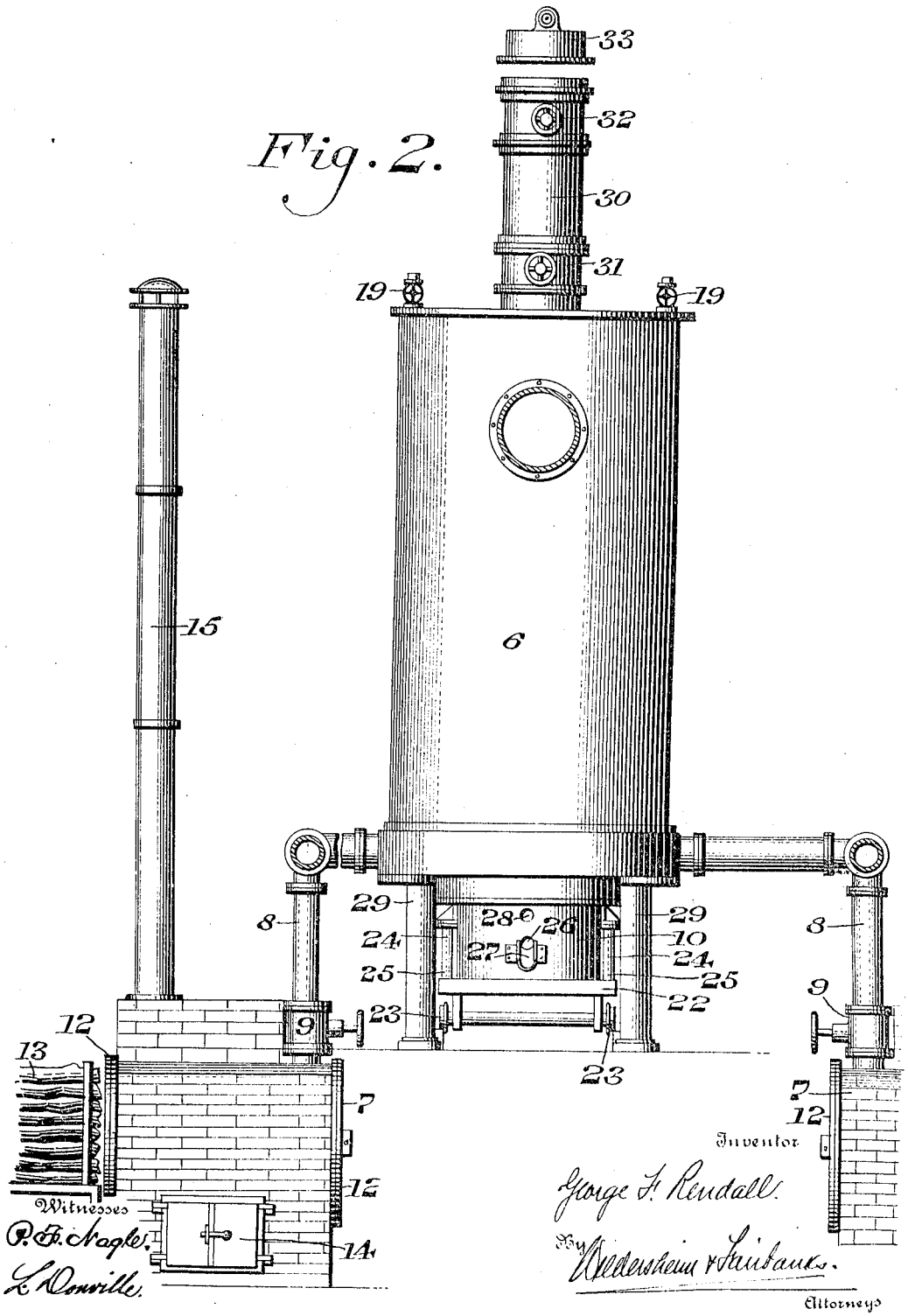

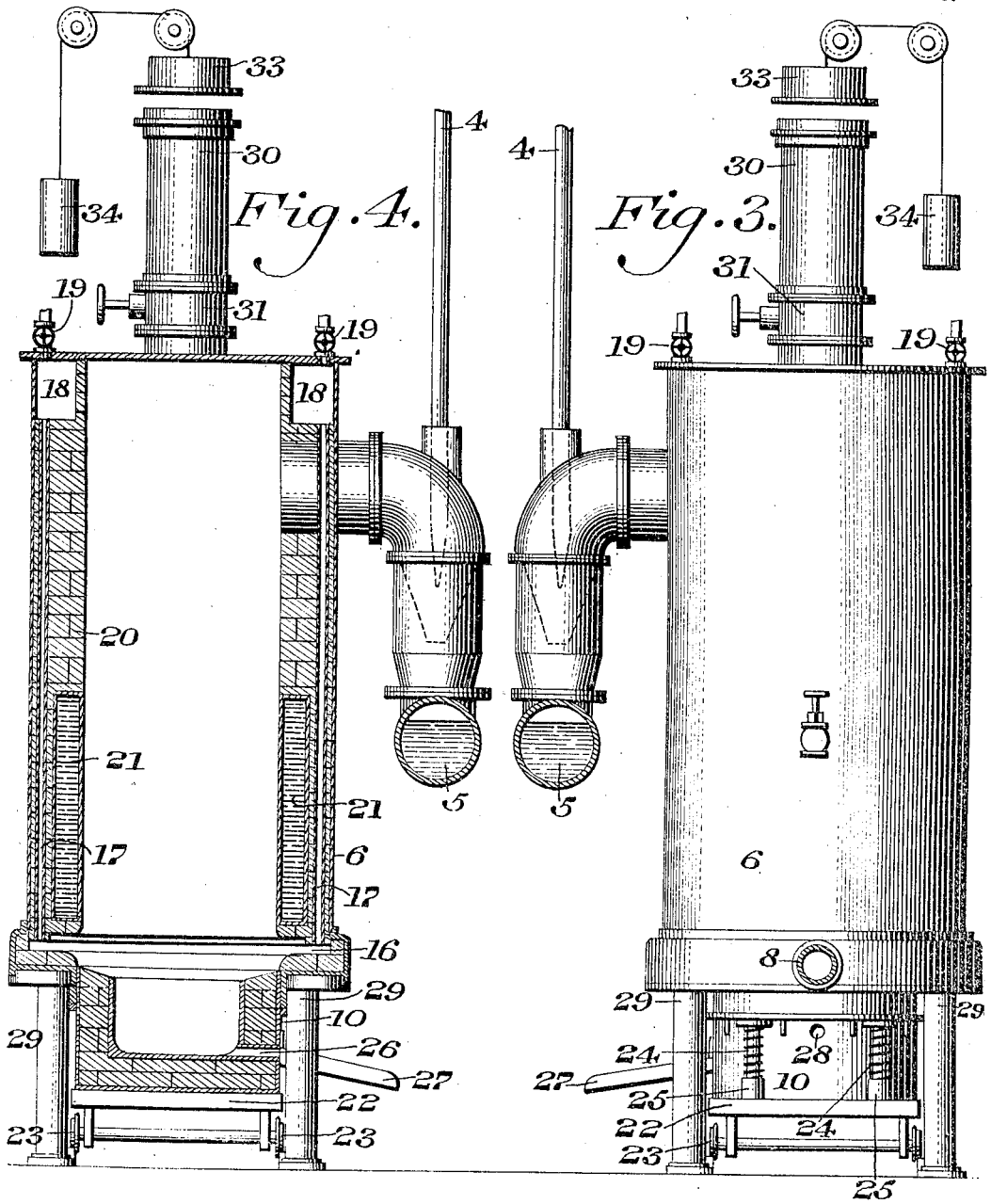

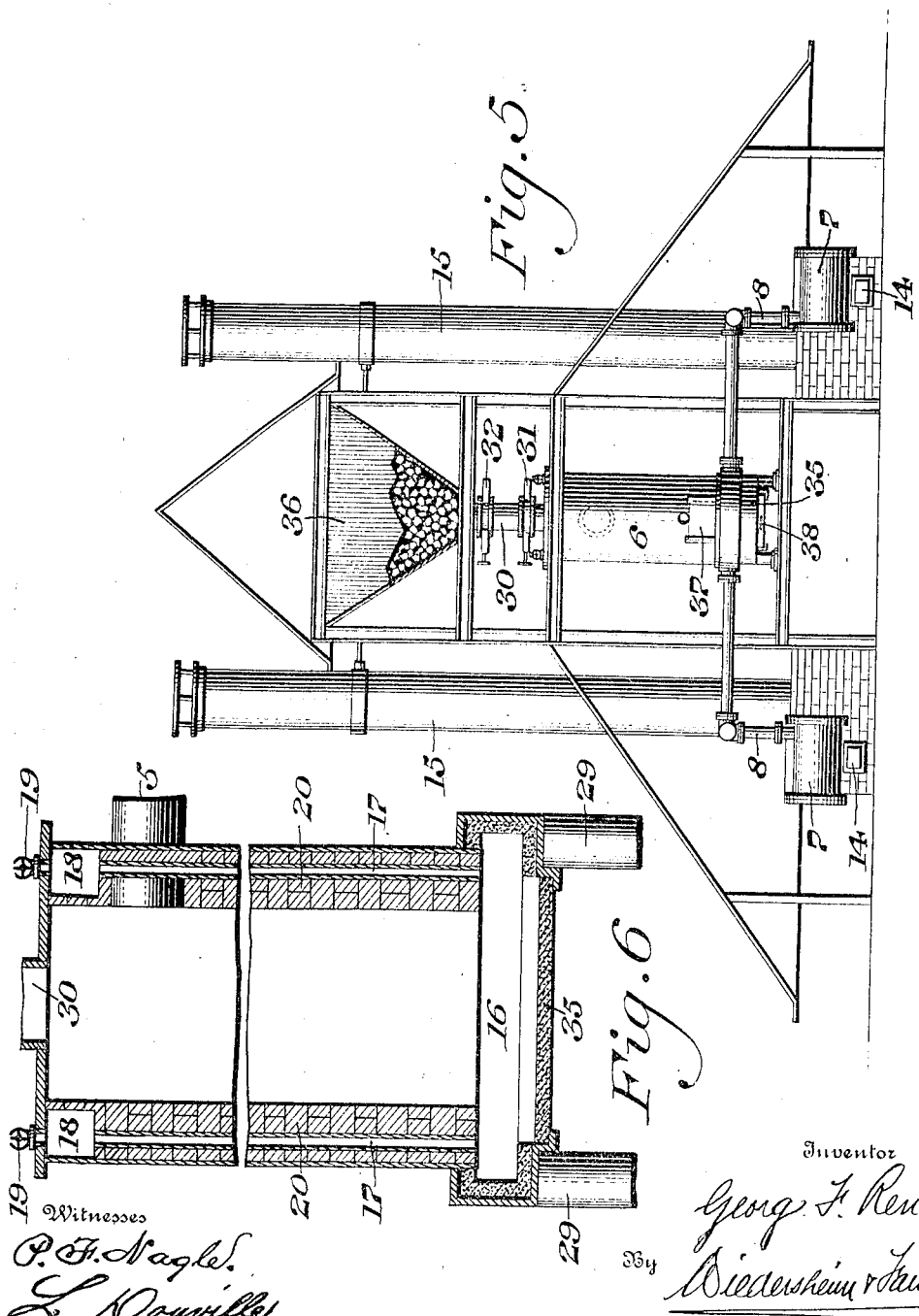

GEORGE F. RENDALL, OF NEW YORK, N. Y., ASSIGNOR TO AMERICAN REDUCTION COMPANY, A CORPORATION OF NEW JERSEY.

FURNACE FOR THE REDUCTION OF ORES.

No. 910,086.   Specification of Letters Patent.   Patented Jan. 19, 1909.

Application filed August 2, 1905. Serial No. 272,358.

*To all whom it may concern:*

Be it known that I, GEORGE F. RENDALL, a citizen of the United States, residing in the city, county, and State of New York, have invented a new and useful Furnace for the Reduction of Ores, of which the following is a specification.

My invention relates to the reduction of ores particularly to those which do not readily volatilize such as iron, copper, gold and silver, with a minimum quantity or entirely without the use of fluxes, and in my method I use in place thereof a reducing gas which always contains an excess of hydrogen which latter prevents the formation of oxids in the furnace and reduces the ore to a metallic condition either in sponge form or otherwise.

My invention consists of a novel construction of an ore reducing furnace in which I dispense with the blast which is usually employed and in lieu thereof I create a suction draft by condensing steam in the escape pipe of the furnace.

It further consists in the introduction of heated reducing gases at the base of the furnace. The necessary air for combustion is introduced at the top of the furnace and this is easily and positively regulated by the attendant in charge.

It further consists in a novel construction for charging the furnace whereby the charge is automatically introduced without appreciably altering the reducing gases contained in said furnace or destroying the vacuum created therein by the condensation of steam.

It further consists in a novel construction whereby the reducing gases generated are introduced into the furnace at a very much higher temperature than has heretofore been found practical.

It further consists of a novel construction of a hearth which is easily and readily removed, as in operating with reducing gas far higher heats can be obtained than is now customary in the ordinary blast furnace and in consequence continuous renewals of the furnace lining become necessary.

It further consists in a novel construction of a heating chamber at the top of the furnace for heating the air which is admitted to the furnace and thus enabling the supply of air to be accurately regulated which in furnaces of this class is of greatest importance.

It further consists in a novel construction of an infusible plate which can be substituted in place of the movable hearth thus enabling the entire contents of the furnace to be readily removed when the process of reduction is that of calcining the minerals and leaving them in sponge form.

It further consists in a novel arrangement of a plurality of retorts which enables a supply of uniform reducing gas to be admitted into the furnace.

It further consists of novel features of construction all as will be hereinafter fully set forth.

Figure 1 represents a plan view of an apparatus embodying my invention. Fig. 2 represents a front elevation of the furnace and wood retort. Fig. 3 represents a side elevation of a furnace showing the vacuum draft. Fig. 4 represents a sectional view of Fig. 3. Fig. 5 represents a front elevation of the furnace as adapted for calcining minerals. Fig. 6 represents a sectional view of a portion of Fig. 5.

Similar numerals of reference indicate corresponding parts in the figures.

Referring to the drawings, 1 designates the base of the apparatus having mounted thereon boilers 2 and 3 which may be of any approved type and by means of which steam is supplied through pipes 4 to the escape chamber 5 for the purpose of creating a vacuum or suction in the furnace 6, said escape chamber 5 opening into the furnace near its upper end.

7 designates a plurality of gas retorts for the production of a suitable reducing gas. These are provided with pipes 8 having suitable valves 9, said pipes opening into the furnace 6 above the hearth 10 and below the charge. Each of the gas retorts 7 is provided with air tight doors 12, which may be removed or opened when it is desired to charge the retorts with wood 13 or other suitable material, from which a hydrogenous gas can be readily produced by external heat.

14 designates a door through which the fuel for externally heating the retorts is introduced, the fumes produced by this combustion passing into the atmosphere through the stack 15. The reducing gas passes from the retorts 7 through the pipe 8 into the internal annular space 16.

17 designates passages connecting the space 16 with a heating chamber 18, which is connected with the atmosphere by means of suitable valves 19.

20 designates the furnace lining through which the passages 17 pass.

21 designates a water jacket of the usual construction, located in the lining near the bottom of the furnace and provided with suitable inlets and outlets. The heating chamber 18 extends around the furnace and is of such size that the air is admitted into the furnace in a highly heated condition. It is of great importance that the admission of the air be accurately controlled and I accomplish this by means of the valves 19. The hearth 10 is mounted upon a suitable carriage 22 provided with wheels 23 which enable the carriage and the hearth thereon to be easily and readily removed when it is necessary to repair the inner portions of the furnace.

24 designates screws or equivalent devices working in threaded boxes 25 secured to the carriage and adapted to raise and lower the hearth 10, it being understood that when it is desired to remove the hearth it must first be lowered before it can be disengaged from the furnace and when said hearth is in position it is suitably luted so as to form an air tight joint.

26 designates an outlet or passage way through which the metallic contents of the furnace may be withdrawn, this outlet communicating with the spout 27.

28 designates an aperture or opening through which the slag is withdrawn. The furnace is suitably supported on pillars or uprights 29.

30 designates a charge pipe at the top of the furnace having a lower valve 31 and either an upper valve 32 or a cover 33. It will be apparent that I may employ both the upper valve and the cover or I may use simply the cover. The cover 33 is preferably provided with a suitable counterweight 34 whereby the same may be easily manipulated. I employ the two valves in the charge pipe or the valve and the cover in order that the cover or upper valve may be closed after the charge is admitted to the feed pipe 30 and thus prevent any change in the condition of the vacuum created in the furnace and the gases therein when the lower valve 31 is opened and the charge admitted to the furnace. The pipe 5 forms a condensing chamber and if desired may be partly filled with water as seen in Figs. 3 and 4 in order that all fumes may be condensed and subsequently recovered.

In the embodiment shown in Figs. 5 and 6, I dispense with the movable hearth and in lieu thereof I substitute the plate 35 suitably constructed of any fusible material. This construction is adopted whenever the furnace content is not reduced to a liquid condition and enables the furnace content to be calcined in the ordinary way, thus removing the sulfur and other deleterious compounds in gaseous form and then enabling the entire furnace content to be subsequently removed.

36 designates a hopper or ore bin connected with the feed pipe 30.

37 designates a door through which a bar or rod may be inserted for the purpose of extracting the material treated if it should not fall readily from said furnace. The plate may be provided with a handle 38 or other suitable means adapting the same to be readily withdrawn and also inserted in place.

It will be evident that various changes may be made by those skilled in the art, which may come within the scope of my invention, and I do not therefore desire to be limited in every instance to the exact construction herein shown and described.

Having thus described my invention, what I claim as new and desire to secure by Letters Patent, is:—

1. In an ore reducing furnace, a furnace lining having an air chamber in its upper portion, a water jacket, at the lower portion, and an annular chamber beneath said water jacket communicating with said air chamber and means for admitting a reducing gas into said furnace above its hearth.

2. In an ore reducing furnace, a furnace lining having an air chamber in its upper portion, a water jacket, at the lower portion, and an annular chamber beneath said water jacket communicating with said air chamber, means for admitting a reducing gas into said furnace above its hearth, and means for creating a suction above the charge.

3. In an ore reducing furnace, a furnace lining having an air chamber in its upper portion, a water jacket, at the lower portion, and an annular chamber beneath said water jacket communicating with said air chamber, means for admitting a reducing gas into said furnace above its hearth, a condenser connected with said furnace near its upper end, and an injector discharging into said condenser.

4. In an ore reducing furnace, a furnace lining having an air chamber in its upper portion, a water jacket at its lower portion, and an annular chamber beneath said water jacket communicating with said air chamber, a removable hearth, a carriage supporting said hearth and means for vertically adjusting said hearth.

5. In an ore reducing furnace, a furnace lining having an air chamber in its upper portion, a water jacket at its lower portion, and an annular chamber beneath said water jacket communicating with said air chamber, a removable hearth, a carriage supporting said hearth and means carried by said hearth.

6. In an ore reducing furnace, a furnace lining having an air chamber in its upper portion, a water jacket at its lower portion, and an annular chamber beneath said water jacket communicating with said air chamber, a removable hearth, a carriage supporting said hearth, means for vertically adjusting said hearth, and means for discharging the metallic contents from said hearth.

GEORGE F. RENDALL.

Witnesses:
 H. S. FAIRBANKS,
 C. D. McVAY.